United States Patent
Chen et al.

(10) Patent No.: US 6,605,380 B2
(45) Date of Patent: Aug. 12, 2003

(54) FUEL CELL PLATE WITH VARIABLE THICKNESS SEALING BEADS

(75) Inventors: Colin Ching-Ho Chen, Barrington, IL (US); Frank Walter Popielas, Naperville, IL (US); Kanu G. Shah, Arlington Heights, IL (US); Dennis F. Person, Rockford, IL (US)

(73) Assignee: Dana Corporation, Toledo, OH (US)

( * ) Notice: Subject to any disclaimer, the term of this patent is extended or adjusted under 35 U.S.C. 154(b) by 182 days.

(21) Appl. No.: 09/794,674

(22) Filed: Feb. 27, 2001

(65) Prior Publication Data

US 2002/0119362 A1 Aug. 29, 2002

(51) Int. Cl.[7] .................................................. H01M 8/02
(52) U.S. Cl. .......................................... 429/38; 429/36
(58) Field of Search .............................. 429/35, 36, 34, 429/37, 38

(56) References Cited

U.S. PATENT DOCUMENTS

| | | |
|---|---|---|
| 4,167,607 A | 9/1979 | de Nora et al. |
| 4,225,654 A | 9/1980 | Tajima et al. |
| 4,264,686 A | 4/1981 | Frank |
| 4,755,429 A | 7/1988 | Nickols et al. |
| 4,973,531 A * | 11/1990 | Zaima et al. .................. 429/37 |
| 5,236,687 A | 8/1993 | Fukuda et al. |
| 6,057,054 A * | 5/2000 | Barton et al. .................. 429/42 |
| 6,440,597 B1 * | 8/2002 | Mizuno ........................ 429/34 |
| 2001/0019791 A1 * | 9/2001 | Ito et al. ...................... 280/276 |

* cited by examiner

*Primary Examiner*—Randy Gulakowski
*Assistant Examiner*—Monique Wills
(74) *Attorney, Agent, or Firm*—Rader, Fishman & Grauer, PLLC

(57) ABSTRACT

A fuel cell apparatus includes at least two facing, parallel plates, stacked together but spaced apart by resilient sealing beads disposed on at least one of the plates. The resilient sealing beads are adapted to facilitate control of fluid flows, such as electrolytes, between the plates and are thus called fluid sealing beads. Each plate contains at least one bolt aperture for securement of the two plates together in the described facing, yet spaced apart, arrangement. Separate beads disposed about the aperture(s) act as aperture load compensation beads. In one preferred embodiment, the fluid sealing beads have one uniform thickness, while the aperture compensation beads have another thickness less than that of the fluid sealing beads. In the same embodiment, the aperture compensation beads are wider, however, than the fluid sealing beads. In another embodiment, the thicknesses of the fluid sealing beads may be varied as a function of proximity of any portion of the fluid bead to the bolt hole apertures, with the thickness of aperture beads being less to accommodate anticipated normally higher stress loads at bolted connections.

20 Claims, 1 Drawing Sheet

FUEL CELL PLATE WITH VARIABLE THICKNESS SEALING BEADS

BACKGROUND OF THE INVENTION

1. Field of Invention

The present invention relates to improved fuel cell assemblies for generating power, and more particularly to improved sealing structures applied to individual fuel cell plates secured together via bolted connections.

2. Description of the Prior Art

It is known to apply resilient sealing beads to the faces of fuel cell plates for control of fluid flows between a plurality of such plates stacked and bolted together for such purpose. In a typical fuel cell arrangement, pluralities of such plates are sandwiched together in a parallel, face-to-face pattern during the conventional assembly of a fuel cell apparatus. The plates are held spaced apart by resilient sealing beads adhesively bonded to the face of at least one of any two adjoining plates. The sealing beads define paths or channels for fluids to flow between the plates, and thus fluid electrolytes are used to transfer energy in this manner as will be appreciated by those skilled in the art.

The cell plates employed in the usual fuel cell are brittle, as they are typically formed of composites that include graphite. Thus, special care must be taken with respect to the handling of the plates during fuel cell construction, manufacture, or repair to assure that the brittle plates will not be damaged or compromised. Such care extends even to the post-manufacture handling of the fuel cell to avoid physically bending or cracking of the brittle plates.

The brittleness issue is particularly exacerbated by the use of bolted connections through apertures distributed about the periphery of the stacked plates. In such cases the apertures may be spaced significant distances from intermediate areas of the plates that contain the fluid sealing beads adapted to control flows of electrolytes between the plates. Thus, the torquing of the bolted connections for securement of the plates together may actually introduce bending moments in the plates, as the intermediately positioned fluid sealing beads tend to counteract the tightening of bolts about the peripheral edges of the plates. Such moments tend to eventually lead to cracking of the brittle plates, particularly during any postmanufacturing handling of fuel cell structures, as noted.

SUMMARY OF THE INVENTION

The present invention provides an improved fuel cell plate construction, wherein sealing bead thickness is controlled over the surface area of the plate, including those areas about bolt apertures used for securing the plates together, in an effort to alleviate over-stressing or cracking of the normally brittle plates. Thus, a plurality of parallel, stacked plates which incorporate the present invention are separated by a plurality of discrete sealing beads disposed over at least one of any two facing plates. In a preferred form, the sealing beads are applied to the faces of the plates by screen-printing techniques to produce accurate thicknesses. The sealing beads are resilient, preferably formed of an elastomeric material, and have varied thicknesses or plate surface heights to accommodate variations in stress levels produced when such plates are bolted together under conventional fuel cell manufacturing techniques. Thus, upon installation of a plurality of fuel cell plates together via bolted connections, the beads are adapted to maintain desired separations between the stacked plates.

To the extent that the highest localized stress areas typically occur in regions immediately adjacent bolt apertures, this invention provides for sealing beads of lower heights or thicknesses about the bolt apertures than for the fluid sealing beads spaced away from the bolt apertures and normally adapted to accommodate fluid flows. In the same preferred embodiment, the sealing beads about the bolt apertures are wider, though of lesser thickness, than the fluid sealing beads. Thus, the fuel cell plates of this invention have compensating thicknesses and widths of the sealing beads about the bolt apertures relative to fluid sealing beads that share the same plate, in order to minimize stress fractures and related premature deterioration of the fuel cell plates.

DETAILED DESCRIPTION OF THE PREFERRED EMBODIMENTS

Figure 1:
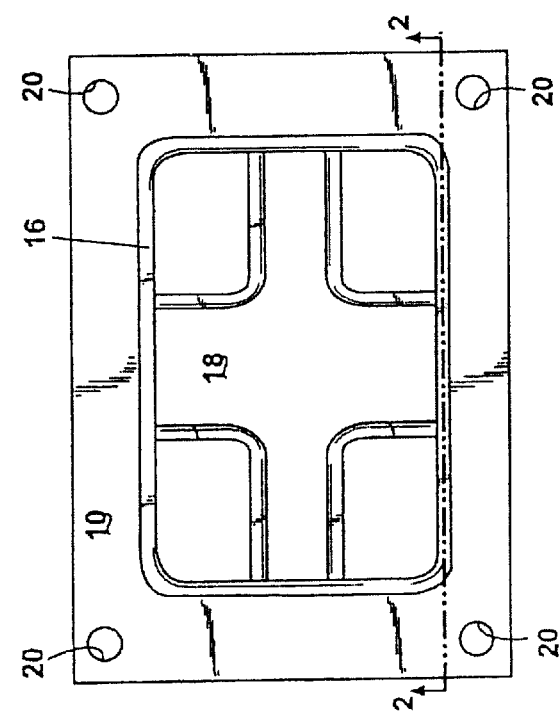
FIG. 1 is a plan view of a fuel cell plate of the prior art, which includes only fluid sealing beads; i.e. sealing beads only in areas spaced away from, or not associated with, apertures.
Figure 2:
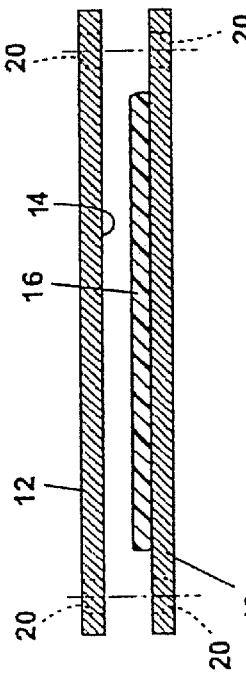
FIG. 2 is a cross-sectional view along lines 2—2 of FIG. 1.

Referring initially to FIGS. 1 and 2, a prior art fuel cell plate 10 is shown, which includes contiguous lengths of a conventional single fluid sealing bead 16, formed of width and height suitable for appropriate control of electrolyte flows in fluid path areas 18 between the beads, after the plates 10 and 12 have been bolted together. The plate 12 is beadless as shown, though if part of a plurality of fuel cell plates comprising a fuel cell, the plate 12 would likely contain a contiguous bead 16 similar to that disposed on the plate 10.

Referring now specifically to FIG. 2, a pair of mated bolt hole apertures 20 of plates 10 and 12 are normally secured together by bolts (not shown). When tightened, the bolts will draw the underside 14 of the upper plate 12 downwardly against the top of the resilient elastomeric bead 16. Those skilled in the art will appreciate that any inadvertent over-torquing of the bolts may over-compress the bead 16, which will cause the bolted areas (20) of the plates 10 and 12, spaced away from the bead 16, to bend together and create undesirable bending stresses in the plates. As noted, such stresses can cause the plates to develop stress cracks, which can ultimately lead to premature failure of the plates, and hence of the associated fuel cell assembly, particularly if the plates are formed of brittle composites, such as those including graphite.

Figure 3:
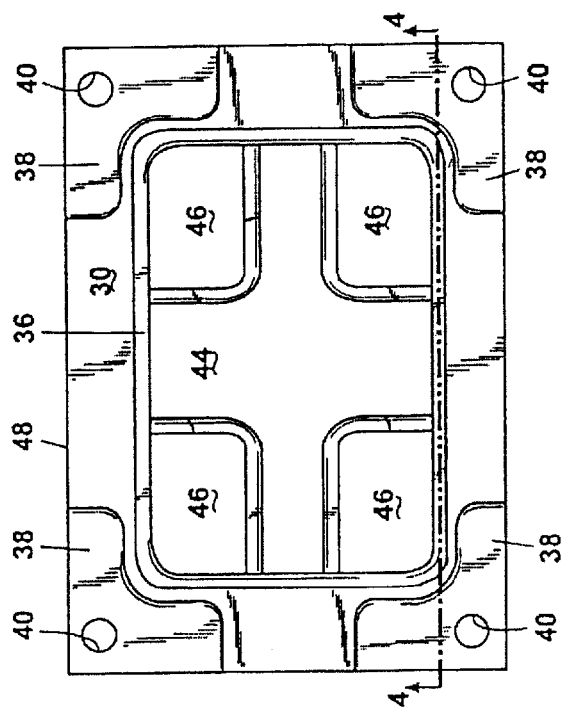
FIG. 3 is a plan view of a fuel cell plate of a preferred embodiment of the present invention, which includes sealing beads of varied heights or thicknesses in both fluid path areas as well as around the bolt aperture areas.
Figure 4:
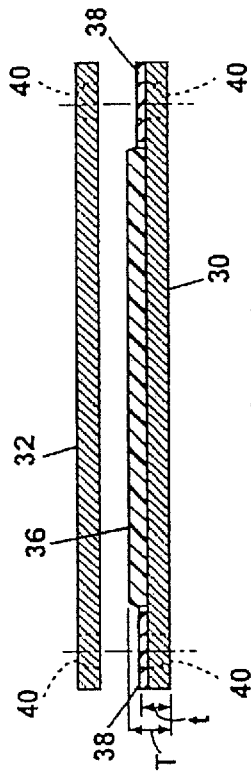
FIG. 4 is a cross-sectional view along lines 4—4 of FIG. 3.

Referring now to FIGS. 3 and 4, a pair of mated fuel cell plates 30 and 32 is constructed in accordance with one preferred embodiment of the present invention. The bottom plate 30 contains resilient beads 36 and 38, as shown. The top plate 32 is shown beadless for convenience of description, but would also likely contain beads 36 and 38 if incorporated in a stack of parallel graphite plates to form a commercial fuel cell assembly. Fuel cell plates as typically used in the applications as herein described are in the range of one-fourth inch thickness each, and often include grooves (not shown) for facilitating fluid flow.

The beads 36 are called fluid sealing beads, and the contiguous lengths of the beads 36 are adapted for maintaining appropriate fluid channels 44 and 46 between the fuel cell plates 30 and 32 after the latter are bolted together through apertures 40 via bolted connectors (not shown). In a first preferred embodiment, the contiguous fluid sealing beads 36 have a unitary or single thickness "T" as shown in FIG. 4. Normally, the thickness "T" would be approximately 0.10 inch.

The beads 38, on the other hand, act as bolt load compensation beads rather than sealing beads. Thus, the beads 38 are called load compensation beads, and for this purpose the beads 38 are disposed about each bolt aperture 40. The beads 38 have a unitary, lesser, thickness "t" to accommodate higher anticipated localized loading at bolted connection areas (40) of the plates 30 and 32. The thickness "t" is approximately 0.05 inch. The beads 38 are also substantially wider than the beads 36 for spreading the higher bolted connection loading over a greater area. Thus the beads 38 are specifically adapted for counteracting plate bending moments associated with the bolting together of the fuel cell plates 30 and 32.

In the described preferred embodiment, the contiguous bead 36 acts as a resilient separation barrier between the plates 32 and 30. The internal borders of the contiguous bead 36 define the described fuel cell electrolyte fluid channels 44 and 46. Such channels 44 and 46 will normally be confined to the medial area of the plates, while the bolt load compensation beads 38 will be normally situated at the apertures 40, disposed about the peripheral edges 48 of the plates 30 and 32. Referring now to FIG. 4, it will be appreciated by those skilled in the art that the load compensation beads 38 must be of lesser thickness than the sealing beads 36. Moreover, it will be particularly advantageous if the beads 38 are also wider than the beads 38. Thus, thinner but wider bolt aperture compensation beads 38 are effective to resist bending of the plates. In order to appreciate this concept intuitively, one has only to reverse the relative thicknesses of the respective beads 36 and 38 as depicted in FIG. 4. It will then be fully realized that a thicker bead 38 at the peripheral edges 48 of the plates 30 and 32 would not facilitate securement of the upper plate 32 down against the top of the bead 36 to adequately seal the channels 44 and 46. Indeed, the compression forces created by the bolting of the apertures 40 would remain entirely about the edges 48 of the plates.

Referring now particularly to FIG. 3, the deposition of the resilient beads 36 and 38, both preferably of an elastomeric material, is feasibly achieved by screen printing. Those skilled in the art will appreciate that screen printing will accommodate both the thicknesses and the widths required to achieve the proposed configurations.

Finally, even though the beads 36 and 38 as described are of uniform thicknesses, this invention contemplates that the beads may alternatively be varied as a function of distance from the bolt apertures. Thus, each bead 36 and 38 could have variable thicknesses, each being adapted to reduce variations in plate stress as a function of proximity of each bolt aperture to any portion of either bead. In each case however, the first sealing bead would have its greatest thickness that points furthest from any one of said apertures, as will be appreciated by those skilled in the art.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled.

What is claimed is:

1. An apparatus comprising:
   at least two plates aligned in parallel, facing yet spaced, proximity to one another, each of said plates comprising at least one bolt aperture, each said aperture of one plate being in alignment with at least one aperture of the other plate;
   a first resilient bead disposed over a portion of the surface of one of said plates spaced from said apertures, said bead having a first thickness and adapted to comprise a resilient barrier of separation between said plates, and wherein said areas of separation comprise sealed channels between said plates, upon securement of said plates together via bolt members passing through said apertures; and
   a second resilient bead disposed about and adjacent said aperture of said one of said plates, said second resilient bead having a second thickness less than said first thickness of said first bead, said different thicknesses of said first and second beads providing reduced stress level variations throughout the plates upon bolted securement of said plates.

2. The apparatus of claim 1, wherein said resilient beads are comprised of an elastomeric material.

3. The apparatus of claim 2, wherein said second resilient bead is wider than said first bead.

4. The apparatus of claim 3 wherein said plates are fuel cell plates formed of a relatively brittle material.

5. The apparatus of claim 3 wherein said plates are fuel cell plates formed of graphite material.

6. The apparatus of claim 4 wherein a plurality of said fuel cell plates are sandwiched together, each plate having said first and second resilient beads disposed on one side thereof.

7. The apparatus of claim 6 wherein a plurality of said apertures are formed in each plate, wherein a majority of said apertures are situated at the edge of any given plate.

8. The apparatus of claim 7 wherein said first and second resilient beads act as fluid sealing beads and aperture bolt load compensation beads, respectively.

9. The apparatus of claim 1 wherein said first and second resilient beads have a plurality of thicknesses, each adapted to reduce variations in plate stress as a function of the proximity of each bolt aperture within said plate to said first resilient bead.

10. The apparatus of claim 9 wherein said bolt apertures are disposed about the periphery of said plates, and wherein the first resilient bead has a thickness that is variable as a function of the proximity of any one of said apertures to said first resilient bead, wherein said first resilient bead has greatest thickness at points furthest from any one of said apertures.

11. An apparatus comprising:
    at least two plates aligned parallel to each other, each plate having a plurality of bolt apertures; and
    a first resilient bead disposed on a portion of a surface of at least one of said plates, wherein said first resilient bead has a thickness that varies as a function of the proximity of any one of said bolt apertures to said first bead, such that said thickness is greatest at points farthest from any one of said bolt apertures,
    wherein said variable thickness of said first bead provides reduced stress level variations throughout said plates upon the bolted securement of said plates.

12. The apparatus of claim 11, further comprising a second resilient bead disposed on a portion said surface about and adjacent to said bolt apertures of said at least one plate, wherein said second resilient bead has a thickness that is less than said thickness of said first bead.

13. An apparatus comprising:
   at least two plates aligned parallel to each other, each plate having a plurality of bolt apertures;
   a first resilient bead disposed on a portion of a surface of at least one of said plates;
   a second resilient bead disposed on a portion of said surface about and adjacent to said bolt apertures of said least one plate,
   wherein said first and second beads have a plurality of thicknesses, each adapted to reduce variations in plate stress as a function of proximity of each bolt apertures to said first or second bead.

14. The apparatus of claim 13 wherein said bolt apertures are disposed about the periphery of said plates, and wherein said first bead has the greatest thickness at points furthest from any one of said bolt apertures.

15. The apparatus of claim 14 wherein said thickness of said second resilient bead is less than said thickness of said first resilient bead.

16. The apparatus of claim 14, wherein said resilient beads are comprised of an elastomeric material.

17. The apparatus of claim 14, wherein said second resilient bead is wider than said first bead.

18. The apparatus of claim 14 wherein said plates are fuel cell plates formed of a relatively brittle material.

19. The apparatus of claim 18 wherein said plates are fuel cell plates formed of graphite material.

20. The apparatus of claim 18 wherein a plurality of said fuel cell plates are sandwiched together, each plate having said first and second resilient beads disposed on one side thereof.

* * * * *